United States Patent [19]

Webb

[11] Patent Number: 4,696,501
[45] Date of Patent: Sep. 29, 1987

[54] ROBOT GRIPPER

[75] Inventor: Winston S. Webb, Clearwater, Fla.

[73] Assignee: Honeywell Inc., Minneapolis, Minn.

[21] Appl. No.: 824,049

[22] Filed: Jan. 30, 1986

[51] Int. Cl.$^4$ .............................................. B25J 15/02
[52] U.S. Cl. .................................. 294/86.4; 414/730; 901/32; 901/34; 294/907
[58] Field of Search ............... 294/86.4, 88, 907, 99.1, 294/104, 116, 106, 111; 414/5, 7, 1, 4, 741, 730, 735, 738, 739, 32; 901/34, 35, 46, 47, 50

[56] References Cited

U.S. PATENT DOCUMENTS

| | | |
|---|---|---|
| 3,550,630 | 12/1970 | Panissidi . |
| 4,243,257 | 1/1981 | Shackleford . |
| 4,351,553 | 9/1982 | Rovetta et al. .......................... 901/34 |
| 4,492,400 | 1/1985 | Yuda . |
| 4,492,949 | 1/1985 | Peterson et al. . |
| 4,529,237 | 7/1985 | Gupta et al. . |
| 4,533,167 | 8/1905 | Johnson ................................ 294/86.4 |
| 4,544,193 | 10/1983 | Dunn et al. . |
| 4,545,722 | 10/1985 | Cutkosky et al. . |

Primary Examiner—James B. Marbert
Attorney, Agent, or Firm—George A. Leone, Sr.

[57] ABSTRACT

An electronic force-detecting robot gripper for gripping objects and attaching to an external robot arm is disclosed. The gripper comprises motor apparatus, gripper jaws, and electrical circuits for driving the gripper motor and sensing the amount of force applied by the jaws. The force applied by the jaws is proportional to a threshold value of the motor current. When the motor current exceeds the threshold value, the electrical circuits supply a feedback signal to the electrical control circuit which, in turn, stops the gripper motor.

19 Claims, 4 Drawing Figures

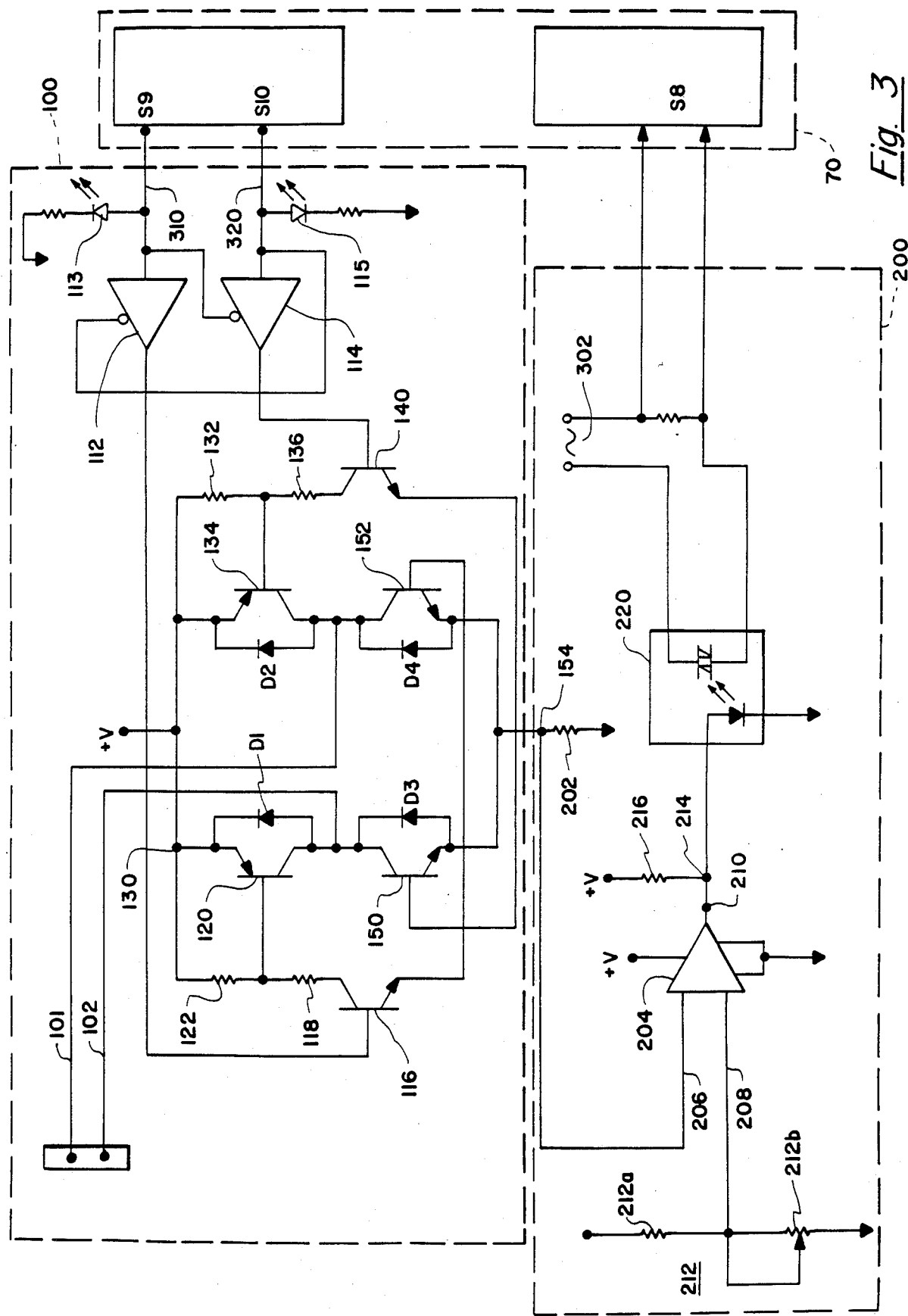

ROBOT GRIPPER

The invention described herein was made in the performance of work under NASA Contract Number NAS8-27980 and is subject to the provisions of Section 305 of the National Aeronautics and Space Act of 1958 (72 Stat. 435; 42 USC 2457).

BACKGROUND OF THE INVENTION

I. Field of the Invention

The invention relates generally to robot gripper apparatus and, more particularly, to an electronic force detecting robot gripper.

II. Discussion of the Prior Art

Robot grippers, also known as end effectors, grasp and secure objects in various manufacturing processes. Many prior art devices have air driven grippers which grasp objects with a sudden, clamping motion. This sudden clamping action of air driven grippers often damages small, delicate parts, such as axial leaded and radial leaded electrical components. Handling by air driven grippers also causes marring of the surface of electrical components, making any identifying markings on the components unreadable.

Another type of mechanism for driving the fingers of a robotic gripper is disclosed in U.S. Pat. No. 4,529,237. A drive for a robotic gripper system is disclosed having a rotationally driven shaft connected to an energy source. A feedback means coupled between the energy source and the fingers can be used to sense and control the position of the fingers. The feedback means does not sense gripper force, and it requires mechanical coupling of feedback means to the fingers in order to determine the finger location.

SUMMARY

The invention comprises first and second gripper jaws for gripping objects which are driven linearly in a first direction for gripping the objects and in a second direction for releasing the objects by a motor means. An electrical circuit means supplies an electrical signal to the motor means for driving the jaws in the first direction, the electrical signal varying as a function of the amount of force applied to the objects by the jaws. Feedback means respond to a preselected threshold of the electrical signal for terminating the driving of the jaws in the first direction.

BRIEF DESCRIPTION OF THE DRAWINGS

For a more complete understanding of the invention, reference is hereby made to the drawings, in which:

FIG. 3 schematically shows a robot gripper drive amplifier circuit and a force sensor circuit.

DESCRIPTION OF THE PREFERRED EMBODIMENT

Figure 1:
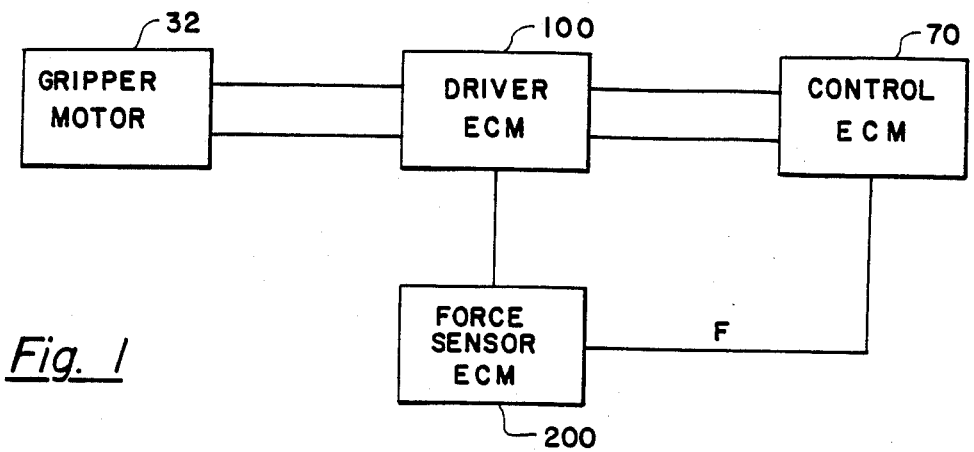
FIG. 1 is a schematic block diagram showing the control line connections of the invention.

FIG. 1 shows a block diagram illustrating the control lines of the electronic force detecting gripper. The controls consist of a first electrical circuit means 70 for controlling the operation of the gripper motor 32, a second electrical circuit means 100 for driving the gripper motor and a third electrical circuit means 200 for sensing the force applied by the gripper on objects being grasped by the gripper jaws. The control means 70 feeds logical code signals to the driver means 100 wherein a first logical code causes the driver means 100 to drive the motor 32 in a clockwise direction, a second logical code causes the drive means 100 to run the motor 32 in a counterclockwise direction, and a third logical code turns off the drive means 100 and, thereby, turns off the motor 32. When the motor is driven by the drive means in a direction closing the gripper jaws (shown in FIG. 2 as 38 and 40), the force sensing means 200 provides a feedback control signal F to the control means 70 causing the control means to turn off the motor 32 when the gripper motor current exceeds a preselected threshold. The preselected threshold corresponds to a predetermined maximum of gripper force. The current threshold and maximum force are advantageously selected to allow for firm handling of objects by the grippers without causing damage to the objects from excessive gripper force.

Figure 2:
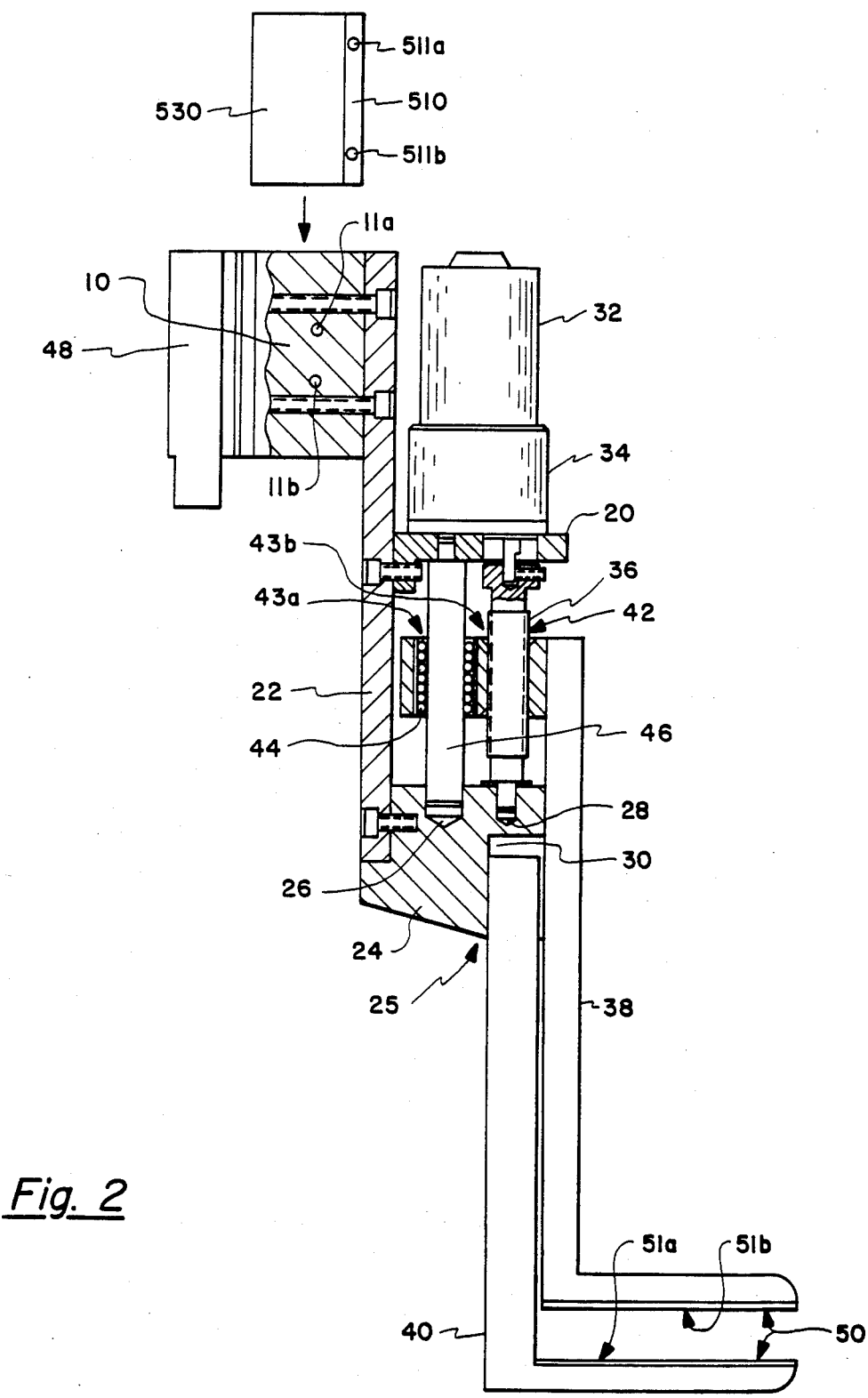
FIG. 2 is a detailed view of the electronic force detecting robot gripper.

FIG. 2 shows a detailed view of the gripper and gripper motor. The gripper motor 32 is coupled to gear means 34 for driving screw drive means 36 which translates the rotational motion of the motor 32 to a linear motion, thereby linearly moving a first gripper jaw 38. The first gripper jaw 38 comprises two members joined to form an "L" shape. Gripper jaw 38 cooperates with a second gripper jaw 40 to grasp objects when the operation of the motor in a counterclockwise direction closes the gripper jaws. In this example, operation of the motor in a clockwise direction opens the gripper jaws. It can be appreciated by one skilled in the art that the relationship between the spin direction of the motor and the movement of the gripper jaws is a matter of design choice, that is to say the motor may be coupled with gear means which opens the jaws when the motor turns in the counterclockwise direction and closes the jaws when the motor spins in the clockwise direction.

A mounting plate 22 secures the motor base 20 and is also fastened to an adaptor means 48 for interfacing between the robot gripper and an external robot arm 530. Connector means 10 for electrically connecting the robot gripper to the external robot arm 530 is mounted on the adaptor 48. The adaptor means 48 is advantageously designed to mate with conventional robot end effectors, for example, air driven robot end effectors. The connector means 10 may advantageously be a quick disconnect connector having electrical interface pins 11A and 11B for electrically connecting to interface posts 511A and 511B mounted on mating connector 510.

The robot gripper further comprises a guide block 24 having a recession 25 suitable for mounting the second gripper jaw 40. The guide block 24 is also fastened to the mounting plate, and further fastened to a second end of the guide shaft 46, and still further engages the screw drive means 36.

The upper member of the first gripper jaw 38 is mounted to the mounting block 42 parallel to the mounting plate 22. The mounting block 42 contains two cyllindrical holes 43a and 43b, the holes having their longitudinal axes running parallel to the longitudinal axis of the guide shaft 46, wherein the first hole contains guide means for slidingly engaging the guide shaft 46. The guide means 44 may advantageously be ball bearing guides press-fit into the first hole 43a of the mounting block 42. The second hole 43b is threaded and cooperates with the driveshaft 36 to move the first gripper jaw linearly upwards or downwards depending upon the spin direction of the gripper motor.

Referring again to FIG. 2, where delicate components are to be handled without marring of any printed material thereon, the gripper surfaces 51A and 51B may be coated with a compound 50 suitable for cushioning the components. In one example of an embodiment of the invention, silicon rubber has been used to effectively protect component markings from marring. Silicon rubber also has the added advantage of being impervious to many harsh chemicals, thereby allowing the gripper and components to be used in a process such as lead preparation prior to affixing the components to a printed wiring board, for example.

FIG. 3 shows a detailed schematic of an example of one embodiment of a robot gripper drive amplifier means 100 and a force sensor electrical circuit means 200 for driving the gripper motor 32 and sensing the gripper force on objects being retained by the gripper jaws 38 and 40. The drive amplifier circuit illustrated comprises a first driver input 310 coupled to a first control output S9 of the control means 70, a second driver input 320 coupled to the second control output S10 of the control means, transistors 116, 140, 120, 152, 134 and 150, a first amplifier 112 and a second amplifier 114. The input of the first amplifier 112 is connected to the first driver input 310. The first amplifier has a noninverting output coupled to the base of the first transistor 116, and an inverting input connected to the input of the second amplifier 114. The input of the second amplifier 114 is coupled to the second driver input 320. A noninverting output of amplifier 114 is coupled to the base of the second transistor 140 and an inverting input of amplifier 114 is coupled to the input of the first amplifier 112. The collector of the first transistor 116 is connected through a first resistance means 118 to the base of the third transistor 120. The emitter of the first transistor 116 is coupled to the base of the fourth transistor 152. The collector of the second transistor 140 is connected through a second resistance means 136 to the base of the fifth transistor 134. The emitter of the second transistor 140 is connected to the base of the sixth transistor 150. The base of the third transistor 120 is connected through a third resistance means 122 to the positive terminal of an external dc voltage source. The emitter of the third transistor 120 is connected to the positive terminal of the external dc voltage source, and the collector of the third transistor 120 is connected to the second output 102 of the drive amplifier circuit to the gripper motor and also to the collector of the sixth transistor 150. The collector of the fourth transistor 152 is connected to the collector of the fifth transistor 134 and to the first output 101 of the drive amplifier circuit to the gripper motor. The emitter of the fourth transistor 152 is connected to the emitter of the sixth transistor 150 and the third output of the drive amplifier at node 154. The base of the fifth transistor 134 is connected through a fourth resistance means 132 to the external dc voltage source and the collector of the fifth transistor 134.

The transistors, resistors and first and second amplifiers are suitably selected so that when a first combination of predetermined logical signals are received through the first and second outputs of the control means, the gripper motor is driven in a clockwise direction, similarly when a second combination of predetermined logical signals are received through the first and second outputs of the control means, the gripper motor is driven in a counterclockwise direction. A third combination of logical signals received from the first and second outputs of the control means will turn off the drive amplifier circuit, and consequently turn off the gripper motor.

The drive amplifier circuit of FIG. 3 may also advantageously include a set of four reverse bias diodes D1, D2, D3 and D4. The diodes are individually connected across the collectors and emitters of transistors 120, 134, 150 and 152 in order to protect the transistors from current surges caused by gripper motor start up or shut down. One may also advantageously include indicator lights indicating the logical states of S9 and S10. These lights are represented in the example of FIG. 3 by LED's 113 and 115, each of which is connected at the anode to one of the inputs of the drive amplifier, and at the cathode through a suitable resistor, to ground.

Still referring to FIG. 3, the force sensing electrical circuit means is also schematically shown in detail. The force sensing circuit comprises an operational amplifier 204 having an inverting input 208, a noninverting input 206 and an output 210. It further comprises a current sensing resistor 202, having two terminals wherein the first terminal is connected to electrical ground and the second terminal is connected to the third output of the drive amplifier at node 154. The force sensing circuit still further comprises a voltage divider network 212 having an output coupled to the inverting input 208 of the operational amplifier 204. The voltage divider network 212 may be comprised of fixed resistors, or may advantageoulsy comprise a fixed resistor 212a and at least one adjustable resistance means, such as a potentiometer 212b as shown in FIG. 3. Also provided are means for converting the output of the operational amplifier 204 from TTL logic levels to about 115 VAC switching levels, the output 210 of the operational amplifier 204 being connected to the converting means 220 whereby a gripper motor control signal is fed back to the control means 70 through control means input S8. The converting means 220 may advantageously be an optical coupler capable of converting TTL logic to 115 volt AC line signals. It can be appreciated that the conversion means may not be necessary in the case of a robot control means 70 which accepts TTL level signals. The force sensing circuit preferably includes a pull up resistor 216 having one terminal connected to the positive terminal of a DC voltage source and the second terminal connected to the output of the operational amplifier 204.

Figure 4:
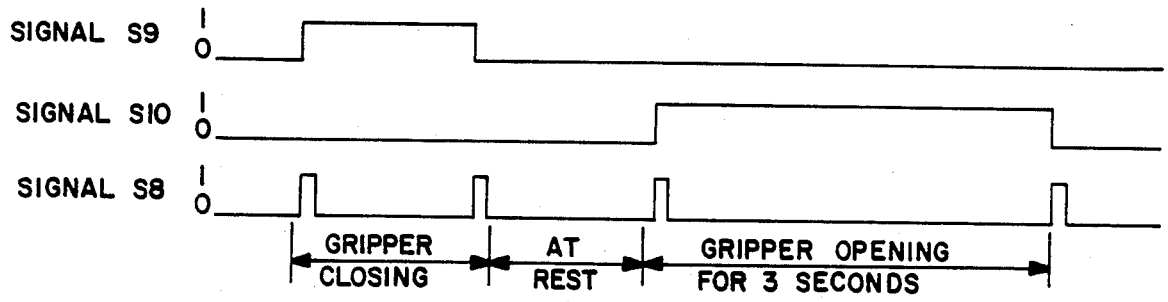
FIG. 4 graphically shows a timing diagram of the gripper motor control signals.

Referring now to the timing diagram shown in FIG. 4, when signal S9 is a logical "1" and signal S10 is a logical "0" transistors 116, 120 and 152 are turned on allowing current to flow to the gripper motor which spins the gripper motor in a counterclockwise direction. After starting the gripper motor, a suitable delay, for example, a one-half second delay, is advantageously programmed into the control means which delays feedback signal S8 from stopping the motor immediately to avoid a current surge. The motor will then continue to spin counterclockwise until S8 becomes a logical "1". Upon receiving a logical "1" at input S8, the control means outputs logical "0"'s to S9 and S10, thereby turning off all transistors in the amplifier drive circuit and stopping the motor. In this example, the above sequence of logical signals will close the gripper jaws until a predetermined threshold current corresponding to design values of force is reached thereby causing the operational amplifier of the force sensing circuit to trip, resulting in S8 switching to a logical "1". After an appropriate delay, as mentioned above, the motor will turn off.

It can be seen that since the force sensor circuit includes an adjustable comparator for sensing current, that the threshold value for turning off the gripper motor may be set anywhere within a range determined by the size of the motor and the gripper assembly. In one embodiment of the electrical force detecting robot gripper, the current threshold is set to current values corresponding to a range of about 0.5 ounces to about 14 ounces of force.

The routine for opening the gripper is as follows. Referring again to FIG. 3, signal S9 is held to a logical "0" and signal S10 is programmed to a logical "1" causing transistors 140, 134 and 150 to turn on. In turn, it causes the gripper motor current to flow in a direction causing the motor to spin clockwise. The clockwise spin of the gripper motor opens the gripper jaws. Before turning off the motor and all transistors, a delay of about three seconds is advantageously employed. S10 and S9 are then both set to logical "0's", thereby turning off all transistors and stopping the gripper motor.

While there has been shown and described a preferred embodiment of the invention, those skilled in the art will appreciate that various changes and modifications may be made to the illustrated embodiment without departing from the true spirit and scope of the invention, which is to be determined from the appended claims.

What is claimed is:

1. An electronic force-detecting robot gripper for gripping objects comprising:

first and second gripper jaws for gripping objects;

motor means for driving the jaws in a first direction to grip the objects and in a second direction to release the objects;

electrical circuit means supplying an electrical signal to the motor means for driving the jaws in the first direction, the electrical signal varying as a function of the amount of force applied to the objects by the jaws and wherein the electrical circuit means for supplying a signal to the motor means further comprises:

feedback means responsive to a preselected electrical signal for terminating the driving of the jaws in the first direction;

a first driver input coupled to the feedback means;

a second driver input coupled to the feedback means;

a first output connected to a first control line of the motor means;

a second output connected to a second control line of the motor means;

a third output connected to the feedback means;

first, second, third, fourth, fifth, and sixth transistors each having a collector, base, and emitter;

a first amplifier coupled to the first driver input having a noninverting output coupled to the base of the first transistor, and further having an inverting input;

a second amplifier coupled to the second driver input and the noninverting output of the first amplifier, the second amplifier having a noninverting output coupled to the second transistor and an inverting input coupled to the input of the first amplifier;

the collector of the first transistor being connected through a first resistance means to the base of the third transistor, and the emitter of the first transistor being coupled to the base of the fourth transistor;

the collector of the second transistor being connected through a second resistance means to the base of the fifth transistor, and the emitter of the second transistor being connected to the base of the sixth transistor;

the base of the third transistor being connected through a third resistance means to an external dc voltage source, the emitter of the third transistor being connected to the dc voltage source, and the collector of the third transistor being connected to the first output of the electrical circuit means and also to the collector of the sixth transistor;

the collector of the fourth transistor being connected to the collector of the fifth transistor and to the second output of the electrical circuit means, and the emitter of the fourth transistor being connected to the emitter of the sixth amplifier and the third output of the electrical circuit means;

the base of the fifth transistor being connected through a fourth resistance means to the dc voltage source and the collector of the fifth transistor; and the transistors, resistors, and first and second amplifiers having parameters selected so that when a first combination of predetermined logical signals are received through the first and second inputs, the motor means drives the jaws in the first direction to grip the objects, when a second combination of predetermined logical signals are received through the first and second inputs, the motor means drives the jaws in the second direction to release the object, and when a third combination of predetermined logical signals are received through the first and second inputs, the motor means is turned off, further, the third output of the electrical circuit means carries the motor means electrical signal to the input of the feedback means.

2. The device of claim 1 wherein the feedback means is a force sensing circuit comprising:

an operational amplifier having an inverting input, a noninverting input and an output;

a current sensing resistor having two terminals wherein the first terminal is connected to electrical ground;

an input coupled to the third output of the electrical circuit means, the noninverting input of the operational amplifier and a second terminal of the current sensing resistor;

a voltage divider network having an output coupled to the inverting input of the operational amplifier;

means for converting the output of the operational amplifier from TTL logic levels to about 115 VAC switching levels, the output of the operational amplifier being connected to the converting means whereby a motor means control signal is transmitted to an input of the electrical circuit means; and the operational amplifier, voltage divider network, sensing resistor and converting means having parameters selected so that, when the motor means electrical signal exceeds a preselected threshold corresponding to the force being exerted on the object by the gripper jaws, the operational amplifier feeds back a feedback electrical signal to the inputs of the electrical circuit means which in turn, turns off the motor means.

3. The device of claim 2 wherein the third, fourth, fifth and sixth transistors of the electrical circuit means each are individually coupled to first, second, third and fourth reverse bias diodes respectively.

4. The device of claim 3 wherein the electrical circuit means additionally comprises:
- a first indicator means for displaying the logical state of the first input of the electrical circuit means; and
- a second indicator means for displaying the logical state of the second input of the electrical circuit means.

5. The device of claim 4 wherein the converting means additionally comprises:
- a pullup resistor having a first terminal connected to an external dc voltage source and a second terminal connected to the output of the operational amplifier; and
- an optical coupler.

6. The device of claim 5 wherein the motor means operates the gripper jaws in the range of from about 0.5 ounces to about 14 ounces of force.

7. The device of claim 6 wherein the gripping surfaces of the first and second gripper jaws are coated with silicon rubber.

8. The device of claim 7 wherein the voltage divider network comprises an adjustable resistance voltage divider network.

9. An electronic force-detecting robot gripper for gripping objects and attaching to an external robot arm, the robot arm being connected to a first electrical means for controlling a robot gripper, comprising;
- a motor base;
- a mounting plate attached to the motor base;
- an electrical dc gripper motor mounted to the motor base;
- a guide shaft having two ends, the first end being fastened to the motor base, with the guide shaft's longitudinal axis parallel to the surface of the mounting plate;
- a mounting block having two cylindrical holes, the holes having each of their longitudinal axes running parallel to the longitudinal axis of the guide shaft, wherein the first hole contains means for slidingly engaging the guide shaft and the second hole is threaded;
- screw drive means for tightening the gripper jaws coupled at a first end to the gripper motor, and threaded through the second hole of the mounting block;
- a guide block fastened to the mounting plate and retaining the second end of the screw drive means and the second end of the guide shaft;
- a first gripper jaw having a gripping surface and an upper member and a lower member joined in an L-shaped configuration, the upper member being mounted to the mounting block parallel to the longitudinal axis of the guide shaft;
- a second gripper jaw having a gripping surface and an upper member and a lower member joined in an L-shaped configuration, wherein the upper member is suitably mounted to the guide block;
- gear means for rotating the screw drive means, the gear means being coupled to the gripper motor and having a shaft attached to the screw drive means;
- an adaptor means for mechanically engaging the robot arm mounted to the mounting plate;
- an adaptor connector mounted to the adaptor means;
- a second electrical circuit means for driving the gripper motor having at least two outputs coupled to the adaptor connector and having a first input connected to a first control output of the first electrical circuit means, a second input connected to a second control output of the first electrical circuit means and having a third output, the second electrical circuit means being capable of driving the motor in clockwise and counterclockwise directions whereby the gripper jaws are opened and closed; and
- a third electrical circuit means for sensing the gripper motor current of the gripper jaws through the third output of the second electrical circuit means as the gripper jaws are closed together to hold objects, and for supplying a feedback output signal to a control input of the first electrical circuit means for stopping the gripper motor when the gripper motor current exceeds a preselected threshold corresponding to a predetermined maximum force on the objects being gripped by the gripper jaws.

10. The device of claim 9 wherein the second electrical circuit means for driving the gripper motor is a drive amplifier circuit which comprises:
- a first driver input coupled to the first control output of the first electrical circuit means;
- a second driver input coupled to the second control output of the first electrical circuit means;
- first, second, third, fourth, fifth and sixth transistors each having a collector, base and emitter;
- a first amplifier coupled to the first driver input having a noninverting output coupled to the base of the first transistor, and further having an inverting input;
- a second amplifier coupled to the second driver input and the noninverting output of the first amplifier, the second amplifier having a noninverting output coupled to the second transistor and an inverting input coupled to the input of the first amplifier;
- the collector of the first transistor being connected through a first resistance means to the base of the third transistor, and the emitter of the first transistor being coupled to the base of the fourth transistor;
- the collector of the second transistor being connected through a second resistance means to the base of the fifth transistor, and the emitter of the second transistor being connected to the base of the sixth transistor;
- the base of the third transistor being connected through a third resistance means to an external dc voltage source, the emitter of the third transistor being connected to the dc voltage source, and the collector of the third transistor being connected to the first output of the drive amplifier and also to the collector of the sixth transistor;
- the collector of the fourth transistor being connected to the collector of the fifth transistor and to the second output of the drive amplifier, and the emitter of the fourth transistor being connected to the emitter of the sixth amplifier and the third output of the drive amplifier;
- the base of the fifth transistor being connected through a fourth resistance means to the DC voltage source and the collector of the fifth transistor; and
- the transistors, resistors and first and second amplifiers having parameters selected so that when a first combination of predetermined logical signals are received through the first and second outputs of the first electrical circuit means the gripper motor is driven in a clockwise direction, when a second combination of predetermined logical signals are received through the first and second outputs of the first electrical circuit means the gripper motor is driven in a counterclockwise direction, and when a third combination of predetermined logical signals are received through the first and second outputs of the first electrical circuit means the gripper motor is turned off, further, the third output of the driver amplifier carries the gripper motor current to the input of the third electrical circuit means.

11. The device of claim 10 wherein the third electrical circuit means is a force sensing circuit comprising:
  an operational amplifier having an inverting input, a noninverting input and an output;
  a current sensing resistor having two terminals wherein the first terminal is connected to electrical ground;
  an input coupled to the third output of the drive amplifier circuit, the noninverting input of the operational amplifier and a second terminal of the current sensing resistor;
  a voltage divider network having an output coupled to the inverting input of the operational amplifier;
  means for converting the output of the operational amplifier from TTL logic levels to about 115 VAC switching levels, the output of the operational amplifier being connected to the converting means whereby a gripper motor control signal is transmitted to an input of the first electrical circuit means; and
  the operational amplifier, voltage divider network, sensing resistor and converting means having parameters selected so that, when the gripper motor current exceeds a preselected threshold corresponding to the force being exerted on the object by the gripper jaws, the operational amplifier outputs an electrical signal to the input of the first electrical circuit means which is fed back to the drive amplifier circuit which turns off the gripper motor.

12. The device of claim 11 wherein the third, fourth, fifth and sixth transistors of the drive amplifier each are individually coupled to first, second, third and fourth reversed bias diodes respectively.

13. The device of claim 12 wherein the drive amplifier additionally comprises:
  a first indicator means for displaying the logical state of the first output of the first electrical circuit means; and
  a second indicator means for displaying the logical state of the second output of the first electrical circuit means.

14. The device of claim 13 wherein the converting means additionally comprises:
  a pullup resistor having a first terminal connected to an external dc voltage source and a second terminal connected to the output of the operational amplifier; and
  an optical coupler.

15. The device of claim 14 wherein the gripper motor operates in the range of from about 0.5 ounces to about 14 ounces of force.

16. The device of claim 15 wherein the gripping surfaces of the first and second gripper jaws are coated with silicon rubber.

17. The device of claim 16 wherein the connector is a quick disconnect connector.

18. The device of claim 17 wherein the means for slidingly engaging the guide shaft comprises ball bearing guides.

19. The device of claim 18 wherein the voltage divider network comprises an adjustable resistance voltage divider network.

* * * * *